United States Patent
Chappalli et al.

(10) Patent No.: US 8,693,541 B2
(45) Date of Patent: Apr. 8, 2014

(54) SYSTEM AND METHOD OF PROVIDING MOTION ESTIMATION

(75) Inventors: Mahesh Chappalli, Irvine, CA (US); Yeong-Taeg Kim, Irvine, CA (US)

(73) Assignee: Samsung Electronics Co., Ltd, Suwon, Gyeonggi-Do (KR)

(*) Notice: Subject to any disclaimer, the term of this patent is extended or adjusted under 35 U.S.C. 154(b) by 2041 days.

(21) Appl. No.: 11/753,478

(22) Filed: May 24, 2007

(65) Prior Publication Data

US 2008/0292000 A1    Nov. 27, 2008

(51) Int. Cl.
*H04B 1/66*    (2006.01)

(52) U.S. Cl.
USPC ............................ 375/240.16; 375/240.24

(58) Field of Classification Search
USPC ............ 375/240.16, 240.24, 240.27; 382/236
See application file for complete search history.

(56) References Cited

U.S. PATENT DOCUMENTS

| | | | |
|---|---|---|---|
| 6,192,079 B1 * | 2/2001 | Sharma et al. | 375/240.16 |
| 6,278,736 B1 | 8/2001 | De Haan et al. | |
| 6,782,054 B2 | 8/2004 | Bellers | |
| 6,996,175 B1 | 2/2006 | Olivieri | |
| 2002/0060686 A1 * | 5/2002 | Matsumoto et al. | 345/582 |
| 2004/0071215 A1 * | 4/2004 | Bellers | 375/240.16 |
| 2006/0120439 A1 * | 6/2006 | Smee et al. | 375/148 |
| 2007/0064803 A1 | 3/2007 | Miao et al. | |
| 2008/0002772 A1 * | 1/2008 | Song et al. | 375/240.16 |

OTHER PUBLICATIONS

G. A. Thomas, *Television motion measurement for DATV and other applications*, Tech. Rpt. 1987/11, BBC Research Dept., 1987.
G. de Haan et al., *Sub-pixel motion estimation with 3-d recursive search block matching*, Signal Processing: Image Communication, No. 6, pp. 229-239, 1994.
G. de Haan et al., *True-motion estimation with 3-d recursive search block matching*, IEEE Trans. DSVT, vol. 5, pp. 207-217, 1995.
G. de Haan et al., *An efficient true-motion estimator using candidate vectors from a parametric motion model*, IEEE Trans. CSVT, vol. 8, pp. 85-91, 1998.
G. de Haan, *Progress in motion estimation for consumer video format conversion*, IEEE Trans. Consumer Elec., vol. 46, No. 3, pp. 449-459, 2000.
Toru Yamada et. al., "Fast and accurate motion estimation algorithm by adaptive search range and shape selection," ICASSP 2005, pp. II-897-900.
Hwang-Seok Oh et. al., "Adaptive adjustment of the search window for block-matching algorithm with variable block size," IEEE Trans. Consumer Electronics, vol. 44, No. 3, pp. 659-666, Aug. 1999.

* cited by examiner

*Primary Examiner* — Jason K. Gee
*Assistant Examiner* — Suman Debnath
(74) *Attorney, Agent, or Firm* — IP Investment Law Group (57) ABSTRACT

A system and method of providing motion estimation is disclosed. A recursive motion estimation module works in conjunction with a non-recursive motion estimation module to provide candidate motion vectors to a selection module. The selection module determines which of the candidates is more likely to yield a desirable result and selects that candidate accordingly.

14 Claims, 9 Drawing Sheets

|  |  |  |
|---|---|---|
| 202(0) | 202(1) | 202(2) |
| 202(3) | 202(4) | 202(5) |
| 202(6) | 202(7) | 202(8) |

SYSTEM AND METHOD OF PROVIDING MOTION ESTIMATION

BACKGROUND OF THE INVENTION

1. Field of the Invention

This application relates to motion estimation in display devices. In particular, this application relates to systems and methods for determining motion vectors for blocks of frame data.

2. Description of the Related Technology

In recent years, advancements in digital video processing have allowed video display manufacturers to produce systems which provide a more realistic viewing experience by enhancing raw digital video. Motion estimation algorithms are commonly used in providing enhanced video. For example, motion estimation algorithms are often utilized when performing de-interlacing of video, video format conversion, and frame rate conversion. Among the different types of motion estimation algorithms, block matching algorithms are often chosen for their superior trade-off between complexity (which is relatively low) and accuracy (which tends to be high). Block matching algorithms generally compare blocks in one frame of video in order to find a matching block from a different frame of video.

Recursive search techniques form one category of block matching algorithms. Recursive search block matching evaluates a limited set of candidate motion vectors to determine the best motion vector for each block of pixels in a video frame. Although the recursive search often performs well and is computationally inexpensive, these recursive algorithms tend not to be well-suited for cases of sudden or rapid change in motion of objects. Another category of block matching algorithms utilize non-recursive techniques. For example, the full-search algorithm (one of several types of non-recursive motion estimation techniques) evaluates all possible motion vector candidates in a pre-defined search range to determine the best matching block. While sudden changes in object motion do not typically impact the accuracy of the full-search (and other non-recursive) estimation results, these techniques are more sensitive to problems such as noise, low dynamic range, and multiple block matches. Accordingly, it would be useful to provide a motion estimation technique which alleviates all of the above-described shortcomings.

SUMMARY OF CERTAIN INVENTIVE ASPECTS

In one embodiment, a method of estimating motion information is provided. The method includes estimating a first motion vector for a first block in a frame of video using a non-recursive motion estimation technique and estimating a second motion vector for the first block in the frame of video using a recursive motion estimation technique. An error metric corresponding to the first motion vector and the second motion vector is determined. The method further includes selecting the motion vector having the better error metric among the first motion vector and the second motion vector.

In another embodiment, a device configured to perform a method of estimating motion information is provided. The method includes estimating a first motion vector for a first block in a frame of video using a non-recursive motion estimation technique and estimating a second motion vector for the first block in the frame of video using a recursive motion estimation technique. An error metric corresponding to the first motion vector and the second motion vector is determined. The method further includes selecting the motion vector having the better error metric among the first motion vector and the second motion vector.

DETAILED DESCRIPTION OF CERTAIN INVENTIVE EMBODIMENTS

Various embodiments include a system and method for providing motion estimation in a display device by utilizing a recursive motion estimation and switching to the result of a non-recursive technique when it is likely to yield a better result. For each block in the video frame, a motion vector is determined using both a recursive algorithm and a non-recursive algorithm. Each motion vector result is analyzed, and the motion vector likely to be the most accurate is selected. The motion vector determined using the non-recursive algorithm may also be incorporated in the recursive logic to provide a more accurate result. By switching to the non-recursive technique, the best features of each technique are available to provide a more accurate result.

Figure 1:
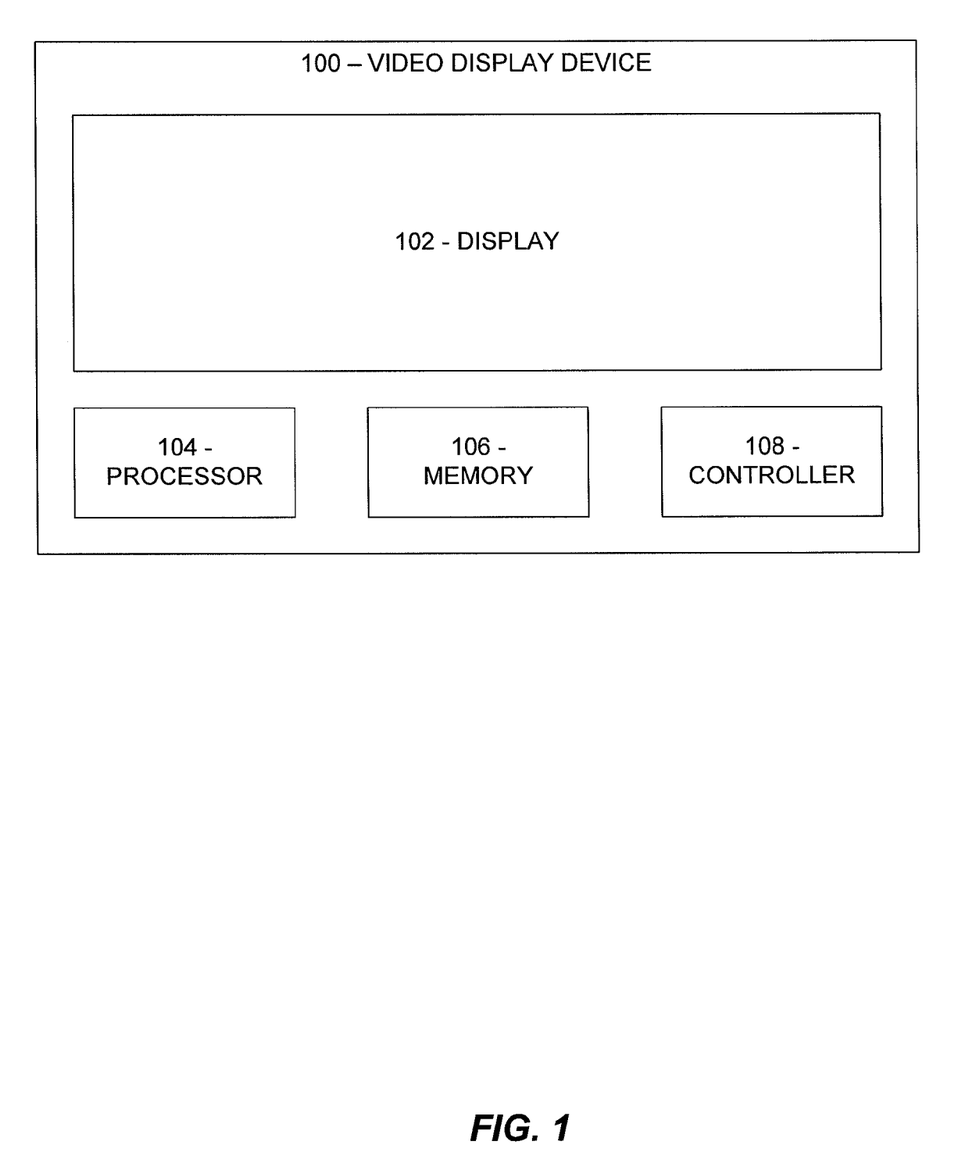
FIG. 1 is a block diagram of a video display device suitable for practicing various embodiments.

FIG. 1 is a block diagram of a display device 100 suitable for practicing one or more aspects described herein. The display device 100 may be a display incorporated into any one of various different types of audio/visual devices including a television, a computer monitor, a mobile telephone, a PDA, a handheld computer, or some other computing device with a graphic display made available to users.

The display device 100 includes various components including a display 102. The display 102 may be any of a number of different types of displays. In one embodiment, the display may be an LCD display. Alternatively, the display may be a plasma display, a CRT display, a DLP projector, or some other display type known in the art. The display device 100 also may include a processor 104. The processor 104 may be any of various types of processors. The processor 104 may be a central processing unit (CPU) with on board graphics capabilities. Other types of processors 104 may also be used. The display device 100 may further include a controller 108. The controller 108 generally receives raw image data from the processor 104 or some other internal device components. Once the data has been received, the controller 108 reformats the raw image data into a format suitable for scanning across the display 102 and sends the reformatted image data to the display 102. In some embodiments, the controller 108 may be associated with the processor 104 as a stand-alone Integrated Circuit (IC). However, the controller 108 may be implemented in various ways. For example, the controller may be embedded in the processor 104 as hardware, embedded in the processor 104 as software, or fully integrated in hardware with the display 102 itself.

Also included in the display device is a memory 106. The memory 106 may also take various forms. In one embodiment, the memory 106 may be dedicated on board chip memory that is included with one or both of the processor 104 and the controller 108. Alternatively, the memory 106 may be general purpose memory that is shared with other hardware and software included in the device. The memory 106 may be some form of random access memory (RAM) such as DRAM, SRAM, VRAM, SDRAM or the like, or it may some other form of memory such as flash memory, for example, which may be used to store data.

Although the illustrative display device 100 has been described with reference to a particular configuration in FIG. 1, a skilled artisan will readily appreciate that the display device 100 may take many forms and configurations. Moreover, the display device 100 may include various other system components not described herein which provide other features generally applicable to the device 100.

Figure 2A:
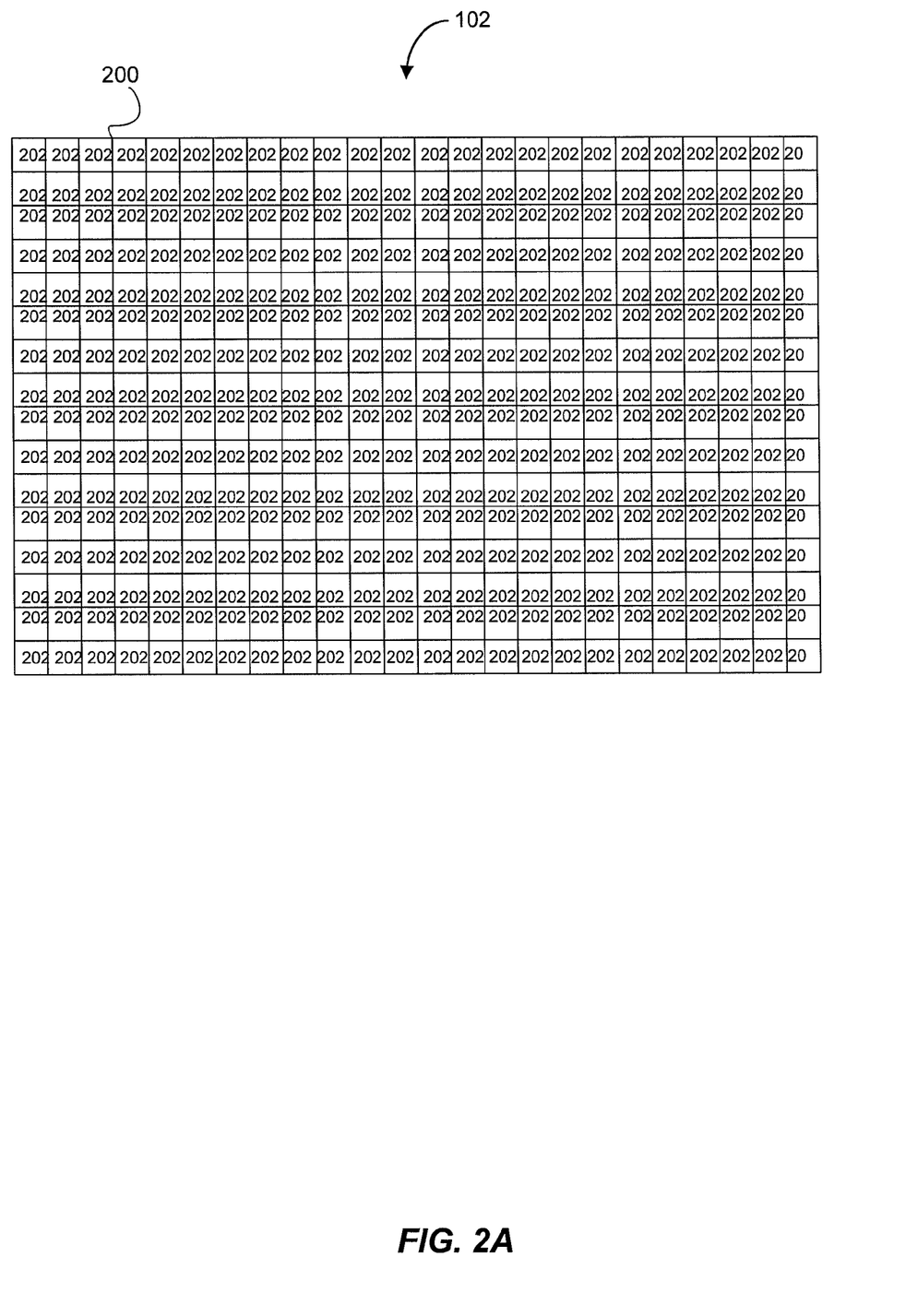
FIG. 2A is block diagram showing a more detailed view of a frame of the display shown in FIG. 1.
Figure 2B:
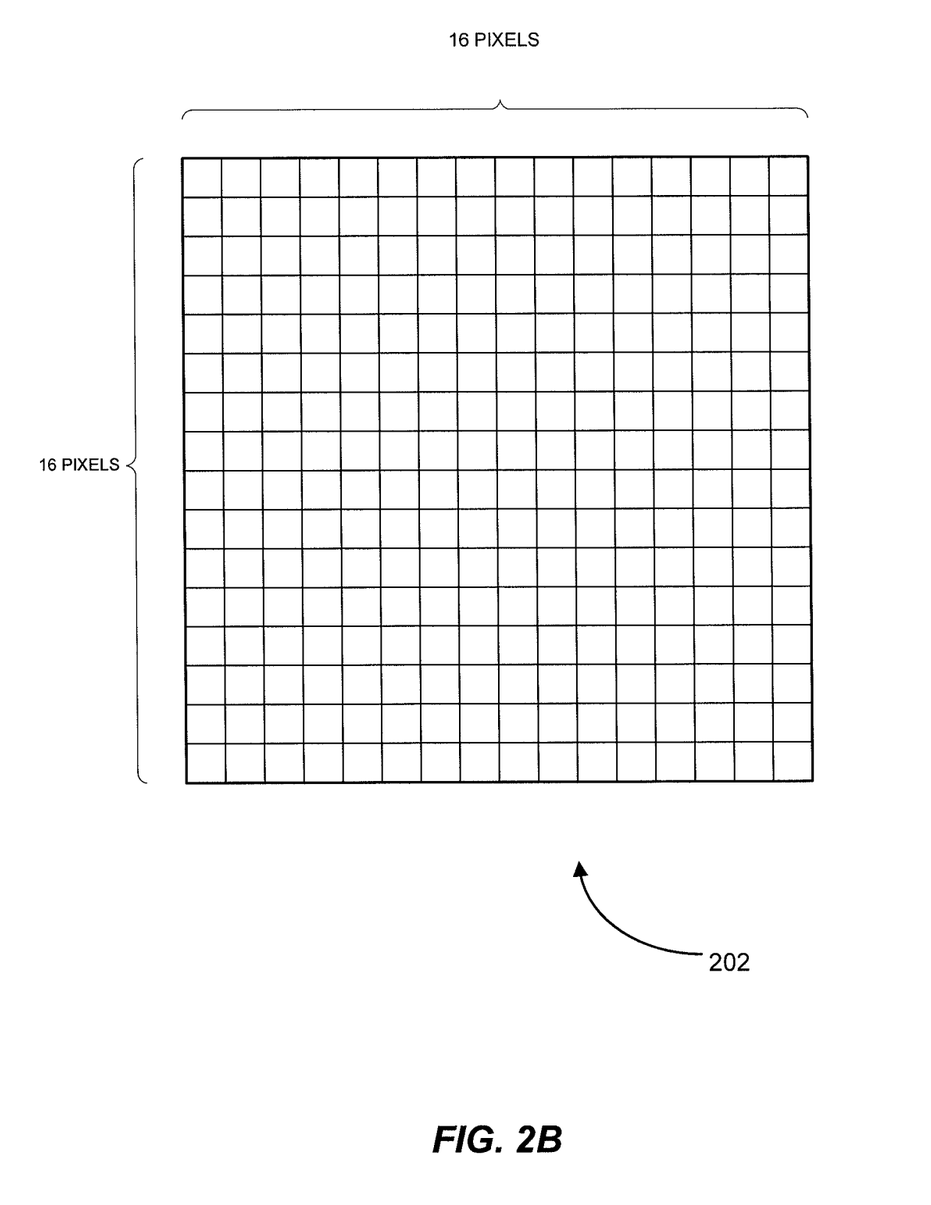
FIG. 2B is an example of a block as shown in FIG. 2A.

Referring now to FIG. 2, an example of a frame 200 of the display 102 is provided. Video data is typically presented in the display device 100 as a series of video frames 200. Each frame 200 may be divided into an array of blocks 202. The blocks 202 are typically rectangular groups of pixels having a fixed size. For example, each frame in the display may be partitioned into 16 by 16 pixel blocks 202 as shown in FIG. 2B. Other block sizes and/or shapes may be used.

Figure 3:
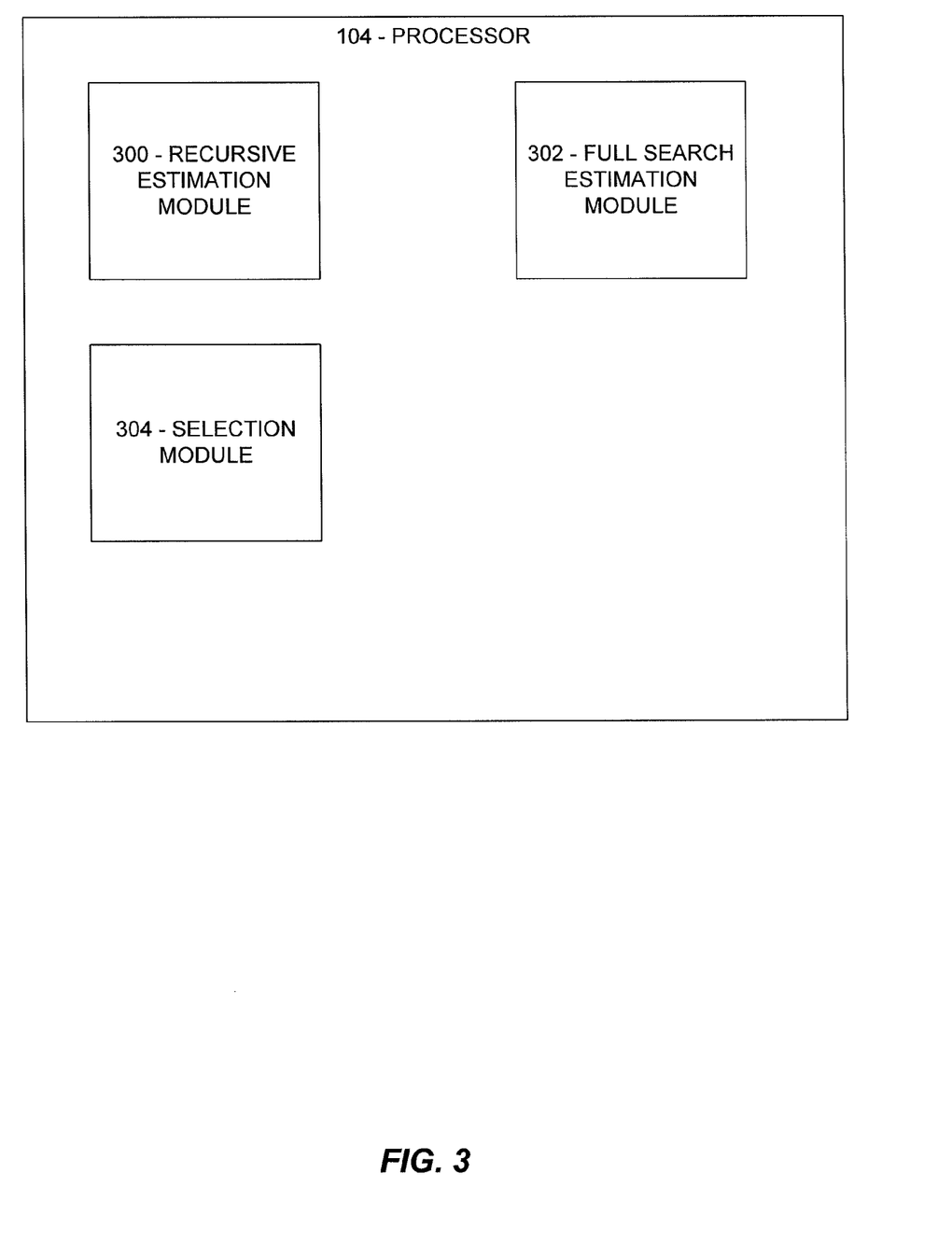
FIG. 3 is a block diagram showing components of the processor from FIG. 1.

Referring now to FIG. 3, a block diagram of the processor 104 is provided. As shown in the figure, the processor 104 may include a recursive estimation module 300. The recursive estimation module 300 typically takes the form of software or hardware which is configured to implement a recursive motion estimation algorithm to yield a motion vector for the blocks in a frame (and will be discussed in further detail below with reference to FIG. 5). Typically, the recursive motion estimation module 300 proceeds in a block-by-block manner from left to right across each row of the block array, starting at the top of the display frame and moving toward the bottom. The recursive motion estimation module 300 is configured to evaluate a limited set of candidate motion vectors which are drawn from both spatially and temporally neighboring blocks in order to estimate the best motion vector for a given block. For example, the recursive motion estimation module 300 may be configured to evaluate the most recently computed motion vectors for the blocks 202 near the current block 202 as will be described in further detail with reference to FIG. 4. As used herein, the current block is the block in a frame for which a motion vector is in the process of being estimated. As will be discussed in further detail below, neighboring blocks from both a current frame and a previous frame may be considered in determining the motion vector for the current block.

In certain embodiments to be described in further detail below, the recursive estimation module 300 may work in conjunction with a non-recursive motion estimation module. In this illustrative embodiment, the non-recursive motion estimation module is a full-search motion estimation module 302. The full-search estimation module 302 may be configured to estimate a motion vector for the current block at the same time the recursive estimation module 300 is estimating a motion vector for that block. Once each of the recursive motion estimation module 300 and the full-search estimation module 302 have estimated a motion vector for the current block, their respective values may be passed to a selection module 304. The selection module 304 may include software which is configured to receive motion estimation results from each of the recursive motion estimation module 300 and the full-search motion estimation module 302 and select the best result in a manner which will be described in further detail below.

Because the recursive motion estimation module 300 generates a motion vector for a given block by evaluating motion vectors of neighboring blocks in both a current and a previous frame, it is necessary to provide information from multiple frames of video data to the recursive module 300. In order to provide this access, the data from a previous video frame (original frame data plus other computed data such as motion information) may be stored in memory 106 so that it may be accessed by the recursive module 300 and the full-search module 302.

Figure 4:
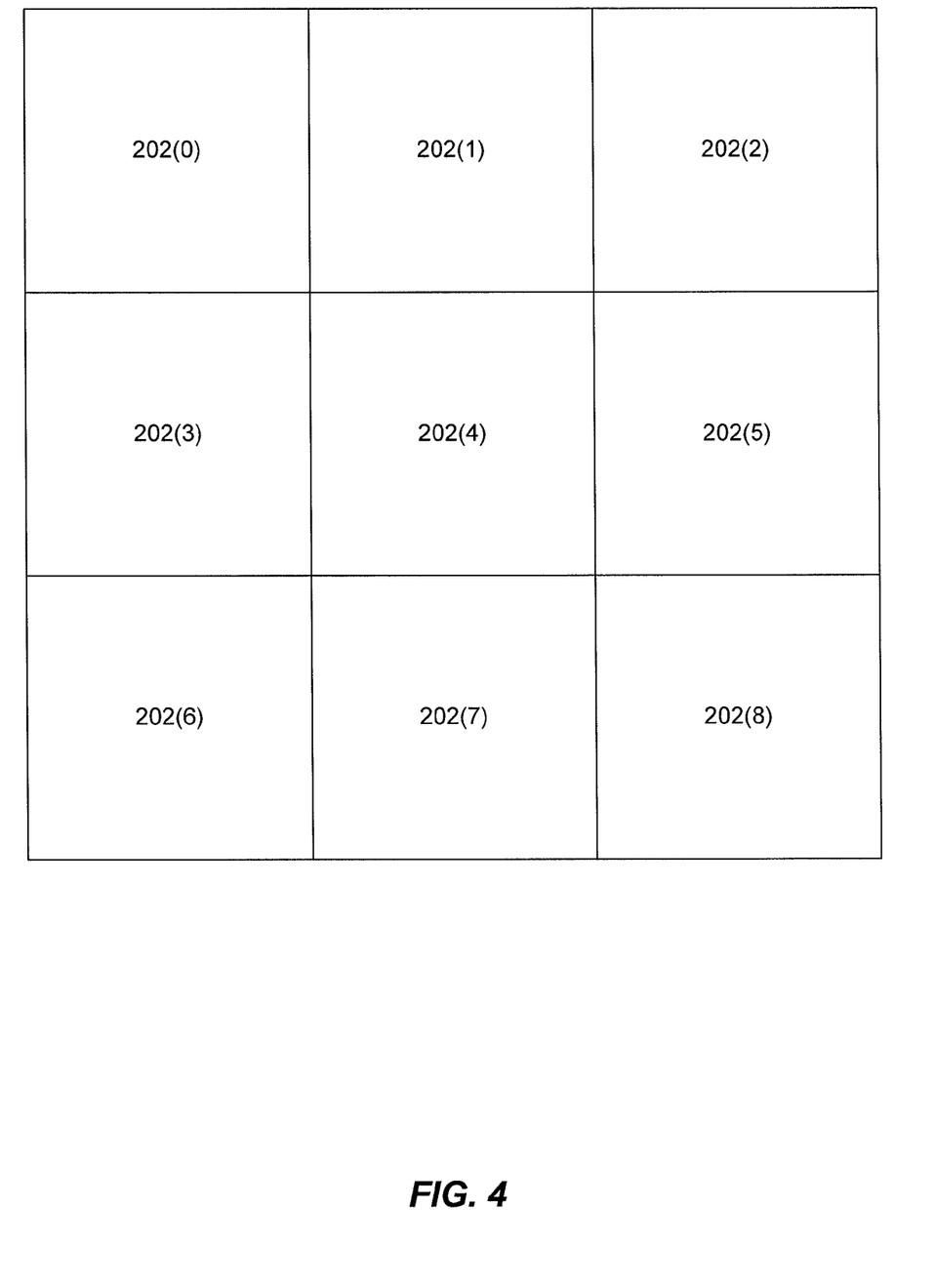
FIG. 4 is a block diagram of a current block and its surrounding blocks.

As noted above, the recursive motion estimation module 300 generates a motion vector for a current block by evaluating the motion vectors of a group of temporally and spatially neighboring blocks. The full-search module 302 may also determine a motion vector for the current block in a separate and independent process. Turning now to FIG. 4, an example of a group of blocks 202 is provided which may be used by the recursive module 300 and to estimate motion vectors for a current block. In this particular example, the group of blocks includes blocks 202(0) . . . 202(8) with block 202(4) being the current block (situated in the center of the group).

In estimating a motion vector for the current block 202(4), the recursive motion estimation module 300 may evaluate the motion vectors of each surrounding block 202(0)-202(3) and 202(5)-202(8) as well as the motion vector of block 202(4) in the previous frame to determine a motion vector for the current block 202(4) as will be described in further detail with reference to FIG. 5 below. Full-search block matching is also performed on the current block 202(4) in order to derive a motion vector using the full-search module 302. In some embodiments that will be described in further detail below, the result from the processing of the current block 202(4) by the full-search module 302 may also be used by the recursive estimation module 300 to determine a motion vector for the current block 202(4). In addition, the motion vectors used by the recursive module 300 for blocks 202(0)-202(3) may be those motion vectors previously calculated for the current frame, while the motion vectors used by the recursive module 300 for blocks 202(4)-202(8) may be the motion vectors for the immediately preceding frame which is stored in memory 106. The reason for the motion vectors of the blocks 202(4)-202(8) being drawn from the prior frame is the top to bottom and left to right progression of processing of blocks 202.

Figure 5:
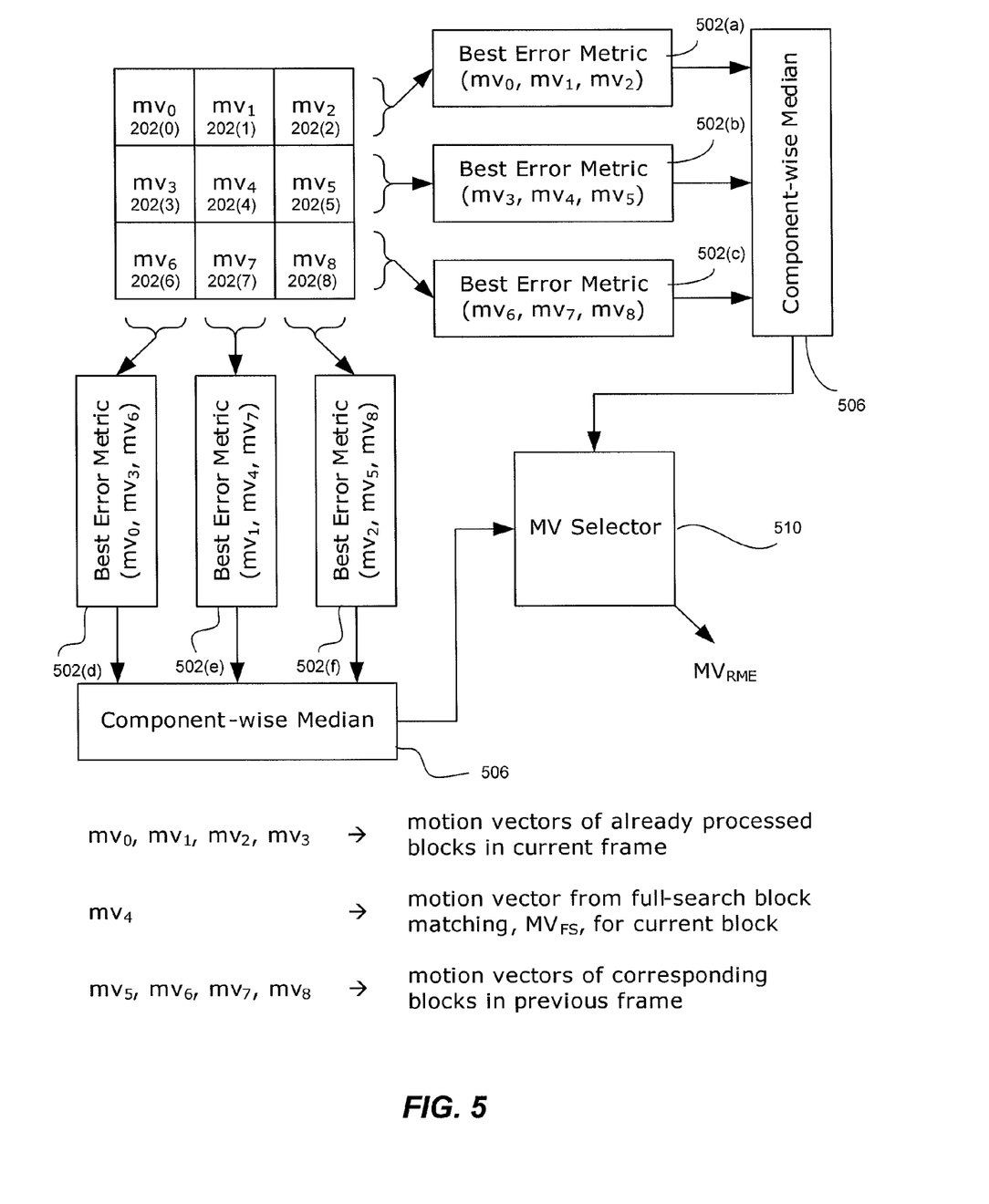
FIG. 5 is a block diagram illustrating recursive motion estimation.

FIG. 5 is a block diagram illustrating an example of the program logic used by the recursive motion estimation module 300 to determine a motion vector $MV_{RME}$ for a current block 202(4) of the group of blocks 202(0) . . . 202(8) from FIG. 4. As shown in the figure, $mv_0$ . . . $mv_3$ are the motion vectors for the already processed blocks in the frame 200. As noted above, because the motion estimation typically proceeds block-by-block from top to bottom and left to right in the frame 200, the motion vectors $mv_5$ . . . $mv_8$ are the motion vectors of the corresponding blocks from the previous frame. The current block 202(4) also has a pre-determined motion vector $mv_4$ associated with it. This motion vector is provided by the full-search module 302 which calculates a motion vector for the current block. In other embodiments, the motion vector of the collocated block of block 202(4) in the previous frame can also be used as motion vector $mv_4$.

In the program logic shown in FIG. 5, the recursive motion estimation module 300 is generally configured to calculate an error metric for each of the motion vectors $mv_0 \ldots mv_8$ applied to the current block 202(4) and utilize the error metrics to determine $MV_{RME}$ for the current block 202(4). In the particular embodiment shown in FIG. 5, a best error metric value 502(a) among the error metrics corresponding to the motion vectors $mv_0 \ldots mv_2$ which are associated with the first row of blocks 202(0) ... 202(2) is determined. A best error metric value 502(b) is also determined for the motion vectors $mv_3 \ldots mv_5$ of the second row of blocks 202(3) ... 202(5). A best error metric value 502(c) is determined for the motion vectors $mv_6 \ldots mv_8$ of the third row of blocks 202(6) ... 202(8). Similarly, best error metric values 502(d), 502(e), and 502(f) are determined for the motion vectors for each column in the group of blocks 202. Depending on the implementation environment, the best error metric value may be the lowest error metric value or it may be the highest error metric value.

In one embodiment, the error metric values are determined as a function of a mean absolute difference (MAD) between two blocks for the motion vector $mv_n$ plus a penalty value. This function may be expressed as:

Error Metric=MAD+Penalty

The MAD value may be calculated in various ways. In one embodiment, the MAD for a motion vector (dx, dy) relating blocks existing in frames indexed by t1 and t2 is calculated according to the equation $$MAD(mv) = \frac{1}{mn}\sum_{i=0}^{m-1}\sum_{j=0}^{n-1} |B_{x,y}^{t1}(i,j) - B_{x+dx,y+dy}^{t2}(i,j)|$$

where $B_{x,y}^{t1}(i,j)$ represents pixel (i,j) within block $B_{x,y}^{t1}$ whose top-left corner is located at (x, y) in a frame indexed by t1. In this representation, location (0,0) within the block refers to the block starting position of (x, y).

The motion of blocks with low variance typically cannot be estimated with a high degree of reliability and hence it is desirable to suppress the contribution of neighboring blocks with low variance in determining the motion vector of the current block. This is achieved by including a penalty term in the error metric that depends on block variance with lower variance resulting in higher penalties and vice versa. Consequently, the error metric of blocks with low variance is increased, reducing the probability of the corresponding motion vector being picked in its row/column. Accordingly, the penalty term shown above may be implemented according to the equation Penalty=$\kappa/\sigma$ where $\kappa$ is a heuristically determined constant and $\sigma$ is an approximation of the block variance which may be computed using the equation $$\sigma = \frac{1}{mn}\sum_{i=0}^{m-1}\sum_{j=0}^{n-1} |B_{x,y}^{t1}(i,j) - \mu|$$

where $$\mu = \frac{1}{mn}\sum_{i=0}^{m-1}\sum_{j=0}^{n-1} B_{x,y}^{t1}(i,j)$$

The motion vectors corresponding to the best error metric values 502(a), 502(b) and 502(c) are then input into a median filter module 506 which outputs a first median motion vector value. The median filter module 506 computes a component-based median value, e.g., a separate median value is determined from the three x-inputs of the motion vectors (corresponding to the horizontal displacement) and the three y-inputs of the motion vectors (corresponding to the vertical displacement) respectively. The two median values are combined into one motion vector and output to a selection sub-module 510. The motion vectors corresponding to the best error metric values 502(d), 502(e), and 502(f) are also passed to a median filter module 506, and a second motion vector value is determined and output to the selection sub-module 510. The selection submodule 510 then selects the motion vector (of the two motion vectors received from the median filter modules 506) corresponding to the least error among the two inputs and outputs the motion vector as $MV_{RME}$.

As noted previously, certain embodiments provide for determining a motion vector using both a recursive algorithm and a non-recursive algorithm for a block, and selecting the better of the two motion vectors as the final motion vector for the block. A selection module 304 (as described above in connection with FIG. 3) is configured to receive a motion vector output from the recursive module 300 ($MV_{RME}$) and the full-search module 302 ($MV_{FS}$). From these two inputs, the better candidate motion vector is selected by the selection module 304 and output as $MV_{out}$.

In some embodiments, the selection module 304 may determine the better motion vector by comparing MAD values corresponding to each of its input motion vectors and selecting the motion vector corresponding to the lower of the MAD values. In other embodiments, the selection module 304 may penalize one of the candidates prior to performing the comparison resulting in a biased comparison. For example, the $MV_{out}$ value may be determined as per the expression $$MV_{out} = \begin{cases} MV_{RME} & \text{if } MAD(MV_{RME}) < \lambda \cdot MAD(MV_{FS}) \\ MV_{FS} & \text{otherwise} \end{cases}$$

where $\lambda$ is a penalty factor that can either be fixed or adaptive. The penalty factor may be determined heuristically through the use of simulations. A fixed penalty factor such as $\lambda=2.0$, for example, may be employed. Alternatively, the penalty factor may be adaptive. An adaptive penalty may be computed using various techniques. In one embodiment, the adaptive penalty is based on the magnitude of the recursive motion vector ($MV_{RME}$) and its corresponding MAD value.

Figure 6:
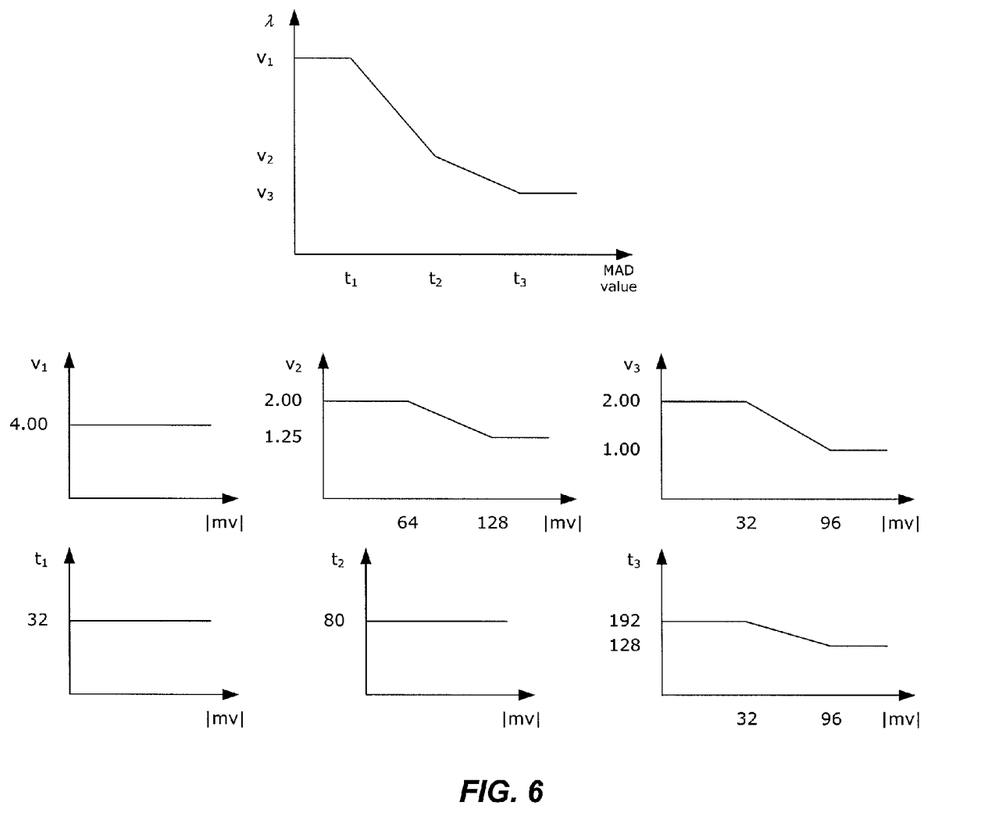
FIG. 6 is an illustration of computing an adaptive penalty.

FIG. 6 provides one example of how the adaptive penalty value may be determined. With reference to the figure, the first (topmost) graph determines the value of the penalty factor, $\lambda$, which ranges between $v_1$ and $V_3$ depending on the MAD value associated with the motion vector $MV_{RME}$. The defining points of this graph, viz. $v_1$, $v_2$, $v_3$, $t_1$, $t_2$, and $t_3$ are themselves adaptively determined based on the magnitude of the motion vector $MV_{RME}$ as depicted in the six other graphs in FIG. 6.

Figure 7:
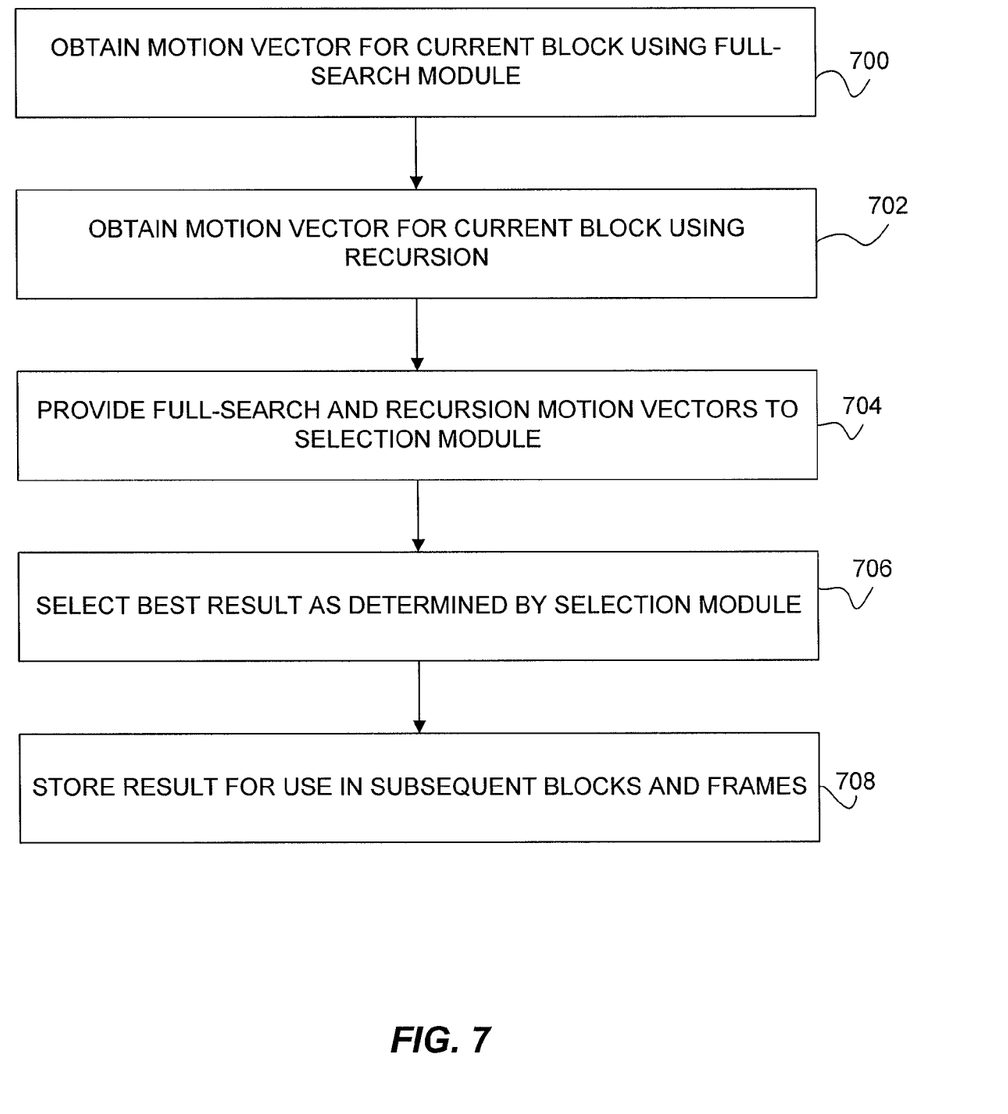
FIG. 7 is a flowchart of a process for providing motion estimation.

Moving now to FIG. 7, a flowchart illustrating a method for providing motion estimation in a display device 100 is provided. The process begins at box 700 where a motion vector for the current block (such as block 202(4), for example) is determined using a full-search or some other non-recursive technique. Next, at box 702, a motion vector for the current block is obtained using a recursive algorithm.

From there the process moves to box 704 where the non-recursive result and the recursive result are each provided to a selection module such as selection module 304, for example.

Next, at box 706, the selection module compares the motion vectors and determines the best result. After determining the best result, the selection module 304 selects the best result and stores it for use in subsequent blocks and frames at box 708.

Figure 8:
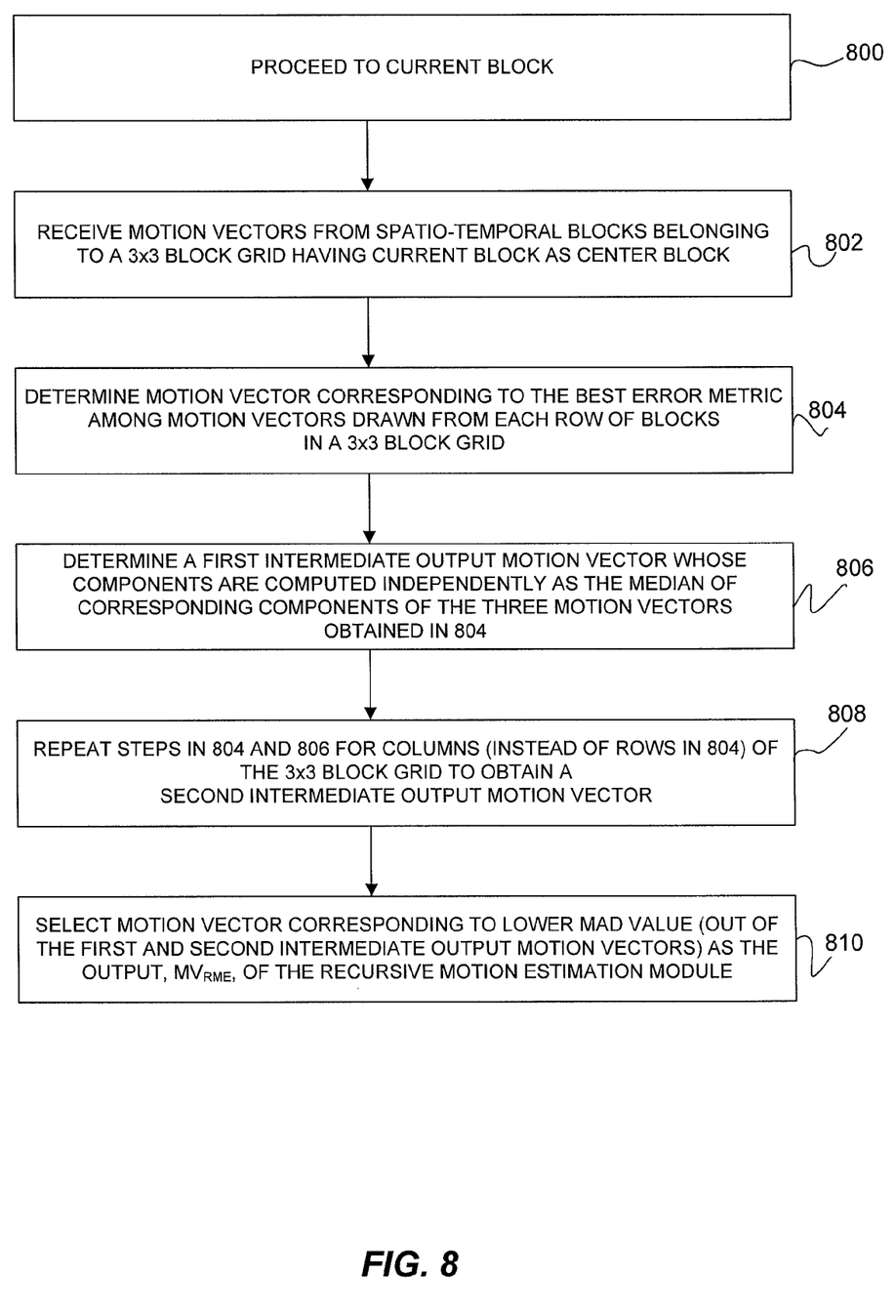
FIG. 8 is a flowchart of the recursive motion estimation performed in FIG. 7.

FIG. 8 is a flowchart which describes a process by which the recursive motion estimation module 300 can compute a motion vector for a current block. The process begins at box 800, where the recursive module 300 moves to the current block. At box 802, the recursive motion estimation module 300 receives motion vectors from each of the spatio-temporally located blocks belonging to a 3×3 block grid having the current block as the center block. The motion vector for the location corresponding to the center block in the grid (same position as the current block) may be drawn from either the result of the non-recursive motion estimation technique for the block in the current frame or the stored motion vector in the previous frame. Next, at box 804, the recursive motion estimation module 300 determines the motion vectors corresponding to the best error metric for motion vectors drawn from each row of blocks in the 3×3 block grid (three motion vectors—one from each row). The process continues at box 806 where the recursive motion estimation module 300 determines an intermediate output motion vector. The components of this intermediate output motion vector are computed independently as the median values of the corresponding components of the three motion vectors obtained in 804. The steps described in boxes 804 and 806 are repeated in box 808 for columns of blocks in the 3×3 block grid (instead of rows in 804) to obtain a second intermediate output motion vector. Once the two intermediate output motion vectors are available, at box 810, the selection sub-module 510 selects the motion vector which corresponds to the lower MAD value (among the two intermediate output motion vectors) as the final recursive motion vector for the current block, $MV_{RME}$.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A method of providing motion estimation, the method comprising:
   estimating a first motion vector for a first block in a frame of video using a non-recursive motion estimation technique;
   estimating a second motion vector, with an integrated circuit, for the first block in the frame of video using the first motion vector and a recursive motion estimation technique;
   determining an error metric corresponding to the first motion vector and the second motion vector; and
   selecting the motion vector having the better error metric among the first motion vector and the second motion vector:
   wherein performing recursive motion estimation includes incorporating the first motion vector into a recursive motion estimation algorithm; and
      wherein the recursive motion estimation algorithm utilizes the first motion vector and other motion vector(s) drawn from a minimum of one spatial neighboring block, temporal neighboring block, or a combination thereof to determine the second motion vector, the spatio-temporal neighboring blocks including eight blocks surrounding the first block to form a 3×3 grid of blocks, includes:
      determining an error metric for each of the motion vectors;
      for each row of blocks in the 3×3 block grid, selecting the motion vector which yields the best error metric for the current first block;
      combining into a first new motion vector the median values of each of the components of the motion vectors selected in the preceding step;
      for each column of blocks in the 3×3 block grid, selecting the motion vector which yields the best error metric for the current first block;
      combining into a second new motion vector the median values of each of the components of the motion vectors selected in the preceding step;
      determining an error metric for each of the first new motion vector and the second new motion vector; and
      selecting as the second motion vector the one of the first new motion vector and the second new motion vector having the better error metric.

2. The method of claim 1, wherein the error metric corresponding to the first motion vector is computed using a mean absolute difference (MAD) metric and the error metric corresponding to the second motion vector is computed using a mean absolute difference metric.

3. The method of claim 2, wherein the error value for the first motion vector further comprises a penalty factor applied to the value obtained using the MAD metric.

4. The method of claim 3, wherein the penalty factor is a constant value.

5. The method of claim 3, wherein the penalty factor is an adaptive penalty based on the magnitude of the second motion vector and the error metric corresponding to the second motion vector.

6. The method of claim 5, wherein at least one of the parameters enabling the computation of the adaptive penalty is determined heuristically by simulation.

7. The method of claim 1, wherein utilizing the first motion vector and other motion vector(s) comprises:
   determining the motion vector corresponding to the best error metric among selected ones of the first motion vector and other motion vector(s); and
   determining an output vector whose first component and second component are computed independently as the median values of the respective components of the selected ones of the first motion vector and other motion vector(s).

8. A device configured to perform a method of providing motion estimation, the method comprising:
   estimating a first motion vector for a first block in a frame of video using a non-recursive motion estimation technique;
   estimating a second motion vector for the first block in the frame of video using the first motion vector and a recursive motion estimation technique;
   determining an error metric corresponding to the first motion vector and the second motion vector;
   selecting the motion vector having the better error metric among the first motion vector and the second motion vector;
   wherein performing recursive motion estimation includes incorporating the first motion vector into the recursive motion estimation algorithm; and
   wherein the recursive motion estimation algorithm utilizes the first motion vector and other motion vector(s) drawn from a minimum of one spatial neighboring block, temporal neighboring block, or a combination thereof to determine the second motion vector, the spatio-temporal neighboring blocks including eight blocks surrounding the first block to form a 3×3 grid of blocks, includes:
  determining an error metric for each of the motion vectors;
  for each row of blocks in the 3×3 block grid, selecting the motion vector which yields the best error metric for the current first block;
  combining into a first new motion vector the median values of each of the components of the motion vectors selected in the preceding step;
  for each column of blocks in the 3×3 block grid, selecting the motion vector which yields the best error metric for the current first block;
  combining into a second new motion vector the median values of each of the components of the motion vectors selected in the preceding step;
  determining an error metric for each of the first new motion vector and the second new motion vector; and
  selecting as the second motion vector the one of the first new motion vector and the second new motion vector having the better error metric.

9. The device of claim 8, wherein the error metric corresponding to the first motion vector is computed using a mean absolute difference (MAD) metric and the error metric corresponding to the second motion vector is computed using a mean absolute difference metric.

10. The device of claim 9, wherein the error value for the first motion vector further comprises a penalty factor applied to the value obtained using the MAD metric.

11. The device of claim 10, wherein the penalty factor is a constant value.

12. The device of claim 10, wherein the penalty factor is an adaptive penalty based on the magnitude of the second motion vector and the error metric corresponding to the second motion vector.

13. The device of claim 12, wherein at least one of the parameters enabling the computation of the adaptive penalty is determined heuristically by simulation.

14. The device of claim 8, wherein utilizing the first motion vector and other motion vector(s) comprises:
  determining the motion vector corresponding to the best error metric among selected ones of the first motion vector and other motion vector(s); and
  determining an output vector whose first component and second component are computed independently as the median values of the respective components of the selected ones of the first motion vector and other motion vector(s).

* * * * *